RE 25517

May 30, 1961 W. A. EATON 2,986,240
LIQUID COOLED BRAKE MECHANISM
Filed Feb. 28, 1957 2 Sheets-Sheet 1

INVENTOR
WILFRED A. EATON
BY Scrivener & Parker
ATTORNEY

May 30, 1961    W. A. EATON    2,986,240
LIQUID COOLED BRAKE MECHANISM
Filed Feb. 28, 1957    2 Sheets-Sheet 2

INVENTOR
WILFRED A. EATON
BY *Scrivener & Parker*
ATTORNEY

United States Patent Office 2,986,240
Patented May 30, 1961

2,986,240
LIQUID COOLED BRAKE MECHANISM
Wilfred A. Eaton, Box 174, North Woodbury, Conn., assignor to Roy S. Sanford, Wilfred A. Eaton, and Erling D. Sedergren, all of Woodbury, Conn., and Roger H. Casler and James O. Eames, both of Washington, Conn.

Filed Feb. 28, 1957, Ser. No. 643,179
16 Claims. (Cl. 188—264)

This invention relates to frictional mechanisms, hereinafter generally referred to as brake mechanisms, and more particularly to frictional mechanisms of the liquid cooled type.

Difficulty has been experienced in the past in connection with mechanisms of the above type due to the intense heat developed at the friction surfaces of the brake mechanism, and it is accordingly one of the objects of the invention to provide a brake mechanism and system so constituted as to most efficiently remove the heat from the friction elements.

Yet another object is the provision of novel frictional mechanism adapted for cooling by means of a circulating liquid.

Still another object of the invention is to provide, in a mechanism of the above type, means for controlling the flow of cooling liquid and the pressure of the cooling liquid in the brake mechanism.

A further object is the provision of means for supporting the friction elements against distortion due to the forces exerted thereon during a brake application.

Another object of the invention is to provide a brake system of the liquid cooled type wherein the pressure of the cooling liquid acting on and supporting the brake friction elements is controlled in accordance with the degree of brake application.

These and other novel features and objects of the invention will be more readily apparent from the following detailed description when taken in connection with the accompanying drawings. It is to be expressly understood, however, that the description and drawings are not to be taken as defining the limits of the invention, reference being had for this purpose to the appended claims.

In the drawings, wherein similar reference numerals are utilized to indicate similar parts throughout the several views, Fig. 1 illustrates, diagrammatically and partially in section, a brake system constructed in accordance with the principles of the present invention;

Figure 1:
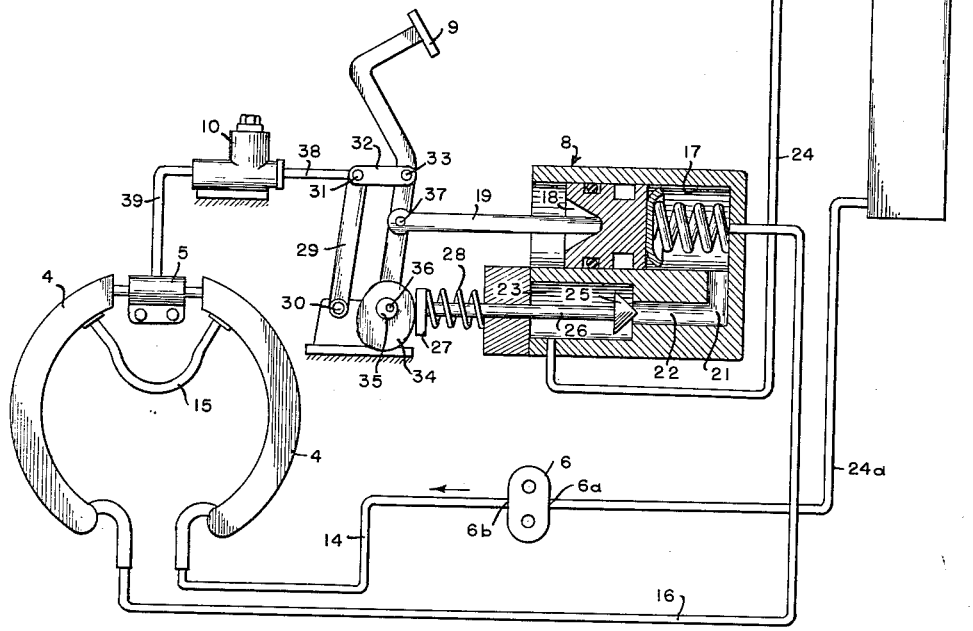
Figure 4:
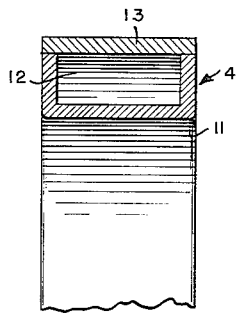
Fig. 4 is a sectional view of one of the brake shoes of Fig. 1.

Referring first to Fig. 1, the system in general includes internal expanding brake shoes 4, adapted to be expanded by a hydraulic brake cylinder 5 to engage a brake drum, not shown, these brake shoes being provided with passages for the circulation of cooling liquid as shown in detail in Fig. 4. The system also includes a liquid circulating pump 6, preferably of the positive displacement type and having inlet and outlet ports 6a and 6b respectively, a heat exchanger or radiator 7, a combined power cylinder and control valve 8, a brake pedal 9, and a conventional type hydraulic master cylinder 10 operated by the pedal 9 through linkage to be described.

Referring to Fig. 4, it will be noted that the brake shoe includes a body portion 11 having a channel 12 for cooling liquid therein extending substantially from one end of the shoe to the other, and a relatively thin metal friction element 13 secured to the body 11 in sealing engagement therewith and serving as a wall for the channel 12. Although various metals may be utilized, the metal friction element 13 is preferably made of copper or similar metal.

The circulating pump 6 may be driven by the vehicle engine or by other suitable means, and outlet port 6b is connected to one end of the right hand brake shoe 4 by means of a conduit 14. The cooling liquid passes from the pump through the channel 12 in the brake shoe and thence to channel 12 in the left hand brake shoe at the upper end thereof through a flexible conduit 15. The cooling liquid then flows downward through the channel 12 in the left hand brake shoe and to the right end of the combined power cylinder and control valve 8 through a conduit 16.

With particular regard to the construction of the combined power cylinder and control valve 8, this includes a housing provided with a cylinder 17 having a power piston 18 slidably mounted therein and connected by means of a rod 19 to the brake pedal 9 as shown. The lower side of the cylinder is provided with a port 21 which connects the cylinder with a chamber 22 in the body of the control valve mechanism. The left hand end of this chamber opens into another chamber 23, and this chamber is connected with the top of radiator 7 through a conduit 24. Liquid flows from the bottom of heat exchanger 7 to pump inlet port 6a through conduit 24a. A control valve 25 is provided with a stem 26 slidably mounted in the left end of the housing, the left end of this rod being provided with an enlarged portion 27. The valve is normally urged to the left to the position shown by means of a spring 28 interposed between the left end of the housing and the enlarged portion 27. Thus, with the parts in the position shown, the piston 18 is retracted, and the control valve 25 is in open position, thus permitting communication between conduit 16 and conduit 24 through the cylinder, the port 21, the chamber 22, the open valve and the chamber 23.

For convenience in explaining the operation of the brake pedal linkage, the brake pedal 9 is shown as being associated with a lever 29 pivotally mounted at 30 on the framework of the vehicle. A pin 31 is provided at the upper end of the lever and a link 32 is mounted on the pin and connected at its right end by means of a pin 33 to the brake pedal as shown. In actual practice, however, the pin 33 on the brake lever would coincide with the pin 31 on the lever 29, and thus the brake lever would be pivotally mounted on and supported by the pin 31 on lever 29. In any case, the lever can rock as shown about the pin 33 or the pin 31, as the case may be, and its lower end is provided with a hub 34 having an enlarged bore 35 therein which surrounds a fixed pin 36. The bore 35 is appreciably larger than the pin 36, and the pin 36 thus provides a stop for limiting the degree of rotation of the brake pedal 9 about the pin 33 in either direction of rotation. With the parts in the position shown, the brake lever is shown rotated clockwise until the bore 35 engages the pin 36, and this is the normal position of the pedal when the brakes are released, the hub 34 engaging the enlarged valve stem head 27. The system shown is intended for manual-power operation, and consequently the piston 18 in the cylinder 17 is connected to the lever through the rod 19 and a pin 37. A brake rod 38 extends from the pin 31 to a piston, not shown, in master cylinder 10.

When it is desired to operate the brake mechanism, and assuming for the moment that the pump 6 is not operating, it will be seen that the mechanism operates in the same manner as a conventional hydraulic brake system. In other words, a conduit 39 connects master cylinder 10 with the brake actuating cylinder 5, and on depression of the brake pedal by the operator, the lost motion between the pin 36 and the bore 35 is first taken up, whereupon the lever pivots about the pin 36 to move the push rod 38 to the left and operate the master cylinder 10 to pump liquid into the actuating cylinder 5 to expand the brake shoes 4 and apply the brake. Thus mechanical operation of the brake is available to the operator in the event the pump 6 is not operating for any reason.

Under power operation, the action is quite different. On initial depression of the brake pedal 9, the pedal tends to pivot about the pin 33, and in so doing forces the hub portion 34 to the right to move the valve 25 toward closed position. With the pump 6 operating to force cooling liquid from the radiator through the brake shoes and back to the cylinder 17 and the control valve mechanism, it will be understood that the closing of the valve 25 tends to restrict the return flow, and to consequently raise the pressure of the liquid in the conduit 16 and in the chambers 12 in the brake shoes, thus providing pressure in those chambers to support the metallic friction elements 13 against distortion inwardly by the braking force. At the same time, this pressure is communicated to the piston 18, causing the piston to tend to move the brake rod 19 to the left. Since the brake rod is connected to the brake pedal 9 below the pivot pin 33, it will be apparent that we have two forces tending to move the brake pedal and the link 32 bodily to the left, these forces being exerted by the piston 18 and by the foot of the operator, and tending to rotate the brake pedal in opposite directions about pivot 33. Thus power operation of the brakes is obtained and the proportion of force exerted by the piston 18 in relation to the force exerted by the operator is dependent on the various leverages, on the size of the piston 18, and on the size of valve 25.

On further depression of the brake pedal, the pedal tends to rock in a counter-clockwise direction about pivot 33, thus closing valve 25 further, and at the same time increasing the force on the master cylinder piston to increase the brake pressure. This further closing of the valve further restricts the return flow of liquid from the brakes and thus increases the pressure acting in cylinder 17 on piston 18. Assuming that the brake pedal is held stationary in the new position, the increased pressure on piston 18 will rock the pedal in a clockwise direction about the operator's foot as a pivot, this movement allowing the valve to open until a condition of equilibrium is reached wherein the movements in opposite directions about pivot 33 due to the forces exerted by the operator, piston 18, and valve 25 are balanced. Thus, regardless of whether or not the valve 25 is responsive to the pressure in chamber 22, it will be apparent that the positioning of the valve may be controlled by the action of piston 18 acted on by the pressure in line 16 and cylinder 17. In like manner, if the piston 18 is dispensed with, the positioning of the valve may be controlled by the operation of the pedal and by the pressure in chamber 22, acting to oppose closing of the valve. In the latter case, operation of the brake will be entirely manual, but the pressure in the cooling chambers of the brake shoes will be proportional to the brake actuating pressure developed by the master cylinder.

It should be noted that closing of the valve 25 is opposed by the pressure of cooling liquid in chamber 22, and that consequently this adds a third force which tends to oppose rotation of the brake pedal in a counterclockwise direction around the pivot point 33. From the foregoing, it will be clear that by properly proportioning the various leverages of the brake pedal linkage, the area of piston 18, and the area of the valve 25, the parts can be so arranged as to provide a definite pressure in the conduit 16 and in the brake shoe chambers for a corresponding definite pressure in the line 39 leading to the brake actuating cylinder 5, and that these pressures may be made proportional or equal. It has been found desirable in some cases to have the pressure of the cooling liquid in the brake shoes above atmospheric pressure in order to provide a force for supporting the friction elements against distortion, but at the same time to have this pressure less than that which operates in the brake shoe cylinder 5 to actuate the brakes, and it will be understood that any desired proportional pressures can be chosen, and that the system can be so designed as to substantially maintain these proportional pressures throughout the range of operation of the brake mechanism.

Figure 2:
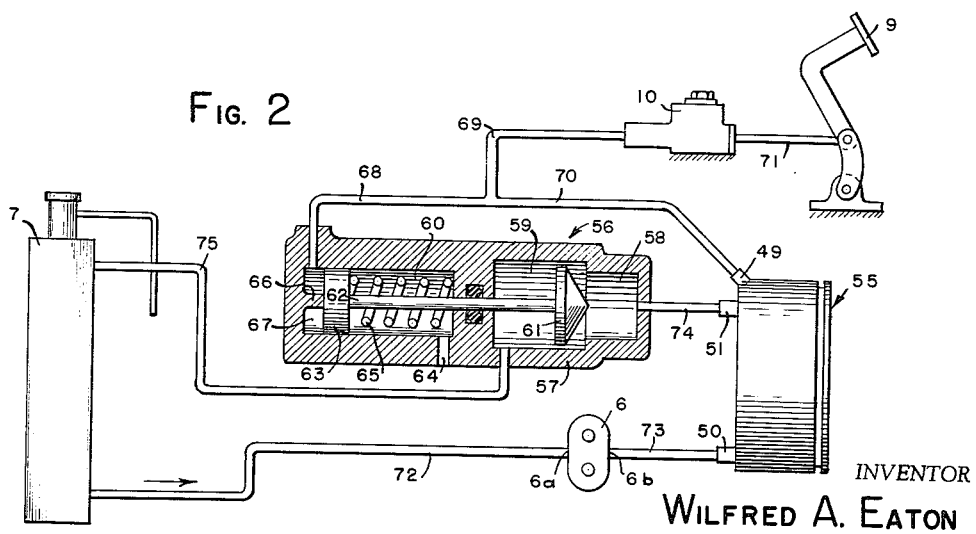
Fig. 2 illustrates, diagrammatically and partially in section, a modified form of brake system.
Figure 3:
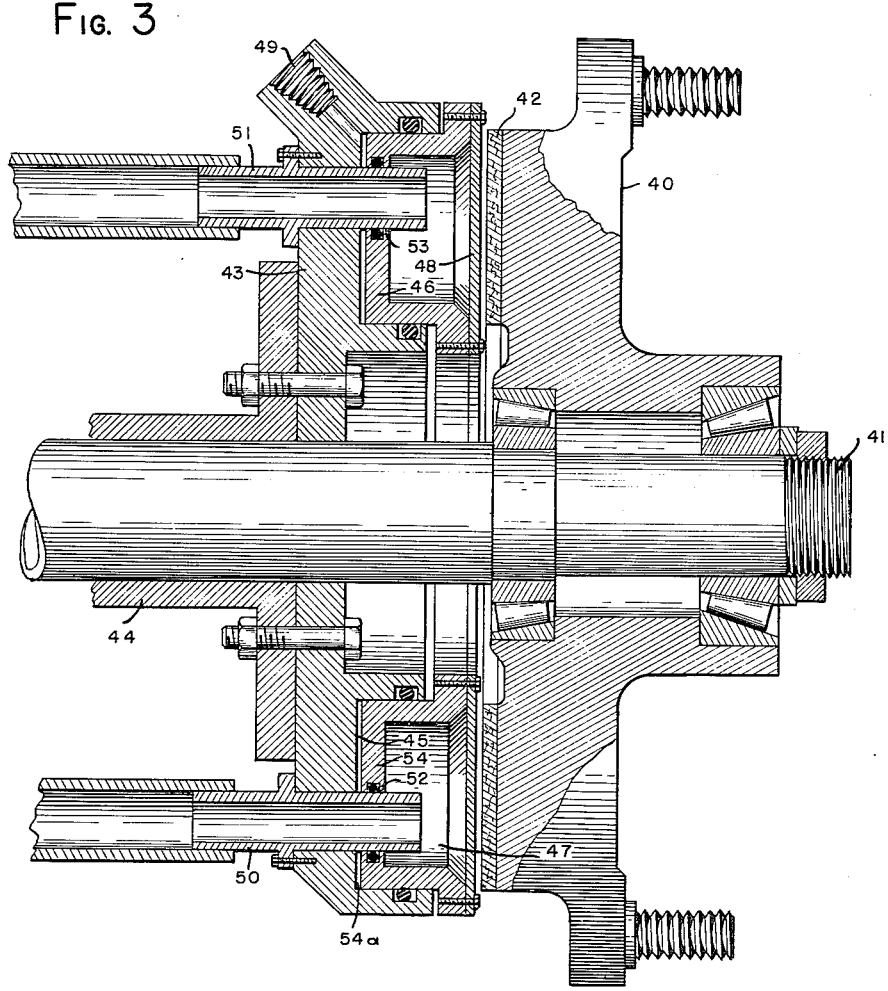
Fig. 3 is a sectional view of a brake actuator mechanism adapted for use in the systems shown in Fig. 1 or Fig. 2.

Referring now to Fig. 2, a modified form of the invention is shown, adapted particularly for use in connection with the brake of the type shown in Fig. 3, although the mechanism can also be used in connection with brakes of the type shown in Fig. 1. Referring first to Fig. 3, the brake includes a wheel 40 mounted on an axle 41 and having a composition annular friction ring 42 mounted on its left face concentric with the axis of the wheel. A cylinder member 43 is secured against rotation to a stationary axle housing 44, and an annular cylinder 45 is formed therein open at its right end. An annular piston 46 is slidably mounted in the cylinder and provided with a channel for cooling liquid 47 as shown, likewise open at the right end. This channel is closed by a thin metallic friction element 48, preferably formed of copper or similar metal and serving as an end wall for the channel in the piston. A port 49 leading to the annular cylinder behind the piston serves to carry hydraulic fluid to the cylinder to urge the piston to the right to effect engagement between the composition friction ring 42 and the metallic friction element 48.

In order to provide circulation of cooling liquid in the channel 47 directly adjacent the left face of the metallic friction element 48, inlet and outlet conduits 50 and 51 are mounted on the cylinder member and extend into channel 47 in the piston through bores 52 and 53 formed therein. The piston has a back wall 54, which forms, in connection with the cylinder, a pressure chamber 54a, and this serves to effectively separate the pressure chamber of the cylinder from the channel 47, it being noted that suitable seals may be provided in bores 52 and 53 to prevent leakage between the two chambers along the conduits 50 and 51 which are slidably mounted in the bores. The conduits 50 and 51 may act as anchors to prevent rotation of the piston in the cylinder.

Referring now to Fig. 2, the system includes a brake 55 which may be constructed as shown and just described in connection with Fig. 3, a liquid circulating pump 6, preferably of the positive displacement type, a heat exchanger or radiator 7, a brake lever 9, a master cylinder 10, and a control valve mechanism 56.

The control valve mechanism includes a housing 57 having a chamber 58 at the right end, an adjacent chamber 59, and a chamber 60 at the left end. The chambers 58 and 59 are normally connected as shown, and communication may be closed off by movement of a valve 61 to the right by means of a rod 62 and a piston 63 on the left end thereof slidably mounted in the chamber 60. The chamber 60 at the right side of the piston is vented to atmosphere as shown by means of a vent 64. A spring 65 urges the valve and piston to the left against a stop 66, and this is the normal position of the valve when the brake is released. A chamber 67 at the left end of the piston is connected by a conduit 68 to the left end of the conventional master cylinder 10 by conduits 68 and 69, a conduit 70 serving to connect the master cylinder with pressure chamber port 49 of the brake shown in Fig. 3. Brake pedal 9 is connected to the piston of the master cylinder, not shown, by rod 71, and on depression of the brake pedal, the master cylinder pumps liquid under pressure to the cylinder of the brake and also to the chamber 67 of the valve mechanism 56. The brake is therefore applied, moving the brake piston to the right and effecting engagement of the frictional elements, and at the same time, the restricting valve 61 tends to move to the right to close off or partially restrict communication between chambers 58 and 59 in the control valve.

The inlet 6a of the pump is connected to the lower part of the radiator by means of a conduit 72, while the outlet 6b is connected to inlet conduit 50 of the brake by a conduit 73. After passing through the channel in the brake piston, the liquid is discharged therefrom through the brake outlet conduit 51, and flows to the chamber 58 of the control valve through a conduit 74. Chamber 59 is connected by a conduit 75 to the top of radiator 7. With the brake pedal in release position, the valve 61 exerts practically no restriction to the flow of cooling liquid between the chambers 58 and 59, but as soon as the brake application is made, it will be understood that the valve is partially closed by the pressure in chamber 67 acting on the piston 63 to urge the valve to the right, and that consequently the pressure of cooling liquid in the conduit 74, in the brake and in the conduit 73 leading from the outlet of the pump to the brake is increased, the degree of pressure increases depending on the area of the piston 63, as well as on the area of the valve 61, the closing of which is opposed by the pressure in chamber 58 acting thereon tending to move the valve to the left. It will be apparent that the dimensions of the piston 63 and the valve 61 may be so chosen with respect to the force exerted by the operator on the pedal 9 as to provide a pressure in channel 47 of the brake which is either lower than, equal to, or higher than the pressure acting in the cylinder 45 to urge the piston to the right to apply the brake. The spring 65 may also be so chosen as to reduce the pressure maintained in the brake cooling chamber. In the embodiment shown in Fig. 3, the area of the brake actuator piston 46 is so chosen as to be substantially equal to the area of the metallic friction element 48 which is directly exposed in the channel and which is unsupported directly on its left face by the piston structure. Consequently when the pressure in the cooling chamber 47 is the same as that in the cylinder, the forces on either side of the metallic friction element 48 will be substantially equal and there will be no tendency to distort the element in either direction regardless of the degree of brake application. The forces need not be completely balanced, however, and the control valve can be arranged to provide a lower pressure in channel 47 than that which is in the cylinder.

It has been found that in many cases in brakes of this type, better heat dissipation can be obtained by using a lower pressure in the cooling chamber than that which is utilized to actuate the piston, assuming again for the moment that the area of the piston is the same as that of the unsupported portion of the friction element. A certain amount of liquid pressure is required in the cooling chamber behind the metal friction element to support the element against distortion due to braking forces, and in liquid cooled brake actuators of the type shown in Fig. 3, for example, wherein the piston area is the same as the area of the friction element which engages the composition friction ring and the same as the unsupported area of the friction element, the forces are balanced on the unsupported portion of the element, and there is no tendency for distortion, provided the pressures are equal.

In heavy duty applications, as on airplanes, for example, it has been found that very high pressures are required to operate the brake piston. In some of the brakes tested at these high pressures, the cylinder was directly connected to the piston channel, so that the pressure in the piston cooling channel was the same as the high pressure required to operate the brake. This pressure raised the boiling point appreciably, and prevented or inhibited nucleate boiling in the cooling liquid channel of the piston, thus resulting in reduced heat dissipation and consequent overheating of the brake. One of these brakes was modified so as to limit the pressure in the cooling liquid channel and thus promote nucleate boiling. This resulted in greatly improved performance, while the reduced pressure in the channel provided sufficient support for the metal friction element to prevent appreciable distortion thereof.

In view of the foregoing it will be apparent that by limiting the pressure of the cooling liquid adjacent the friction element to promote the more efficient nucleate boiling, while at the same time maintaining the coolant pressure in the channel substantially proportional to the brake actuating force, the most efficient cooling conditions are maintained, and at the same time the metallic friction element is adequately supported against distortion, it being understood that the friction element itself will stand a certain amount of force without distortion. Although this discussion has been related primarily to brake actuators of the type shown in Fig. 3, it is equally applicable to the brake system of Fig. 1, wherein shoe type brakes are utilized actuated either by power-manual operation or by manual operation only.

The brake system of Fig. 1, in the form specifically illustrated, is of the servo type, part of the brake actuating force being supplied by a liquid circulating pump and a proportional part of the force being supplied by the operator, the operator supplied force controlling the degree of force supplied by power.

It is readily apparent from the foregoing, that the principles of the invention, as particularly set forth in connection with the systems shown in Figs. 1 and 2, are readily applicable to any liquid cooled brake wherein it is desirable to control the pressure of the cooling liquid in the brake shoe in accordance with the actuating force acting on the shoe.

Although the invention has been illustrated and described with considerable particularity, it should be understood by those skilled in the art that other forms may be utilized without departing from the spirit of the invention. Reference will be had, therefore, to the appended claims for a definition of the limits of the invention.

What is claimed is:

1. A liquid cooled brake system including a brake shoe having a chamber for cooling liquid having inlet and outlet ports, one wall of the chamber having an outer surface adapted for frictional engagement with an adjacent rotatable friction member, a fluid actuator operatively associated with said brake shoe for moving the latter to effect frictional engagement of said outer surface with said member, said actuator having a pressure chamber separate from said cooling liquid chamber, operator controlled means for supplying fluid under pressure to said pressure chamber and for controlling the pressure of fluid in said actuator pressure chamber, means for circulating a cooling liquid through said brake shoe chamber including a heat exchanger, a pump having suction and discharge ports, a conduit connecting the heat exchanger with the suction port, a conduit connecting the discharge port with the inlet port of the brake shoe, and a return conduit connecting the brake shoe outlet port with the heat exchanger, and means to oppose distortion of said outer surface during frictional engagement of the latter with said member, comprising means for maintaining the pressure of the liquid in said brake shoe chamber substantially proportional to the pressure of fluid in said actuator pressure chamber including a normally open flow restricting valve in said return line, and means connecting said operator controlled means and valve to urge the valve toward closed position when the operator controlled means is operated to increase the pressure of fluid in said actuator pressure chamber.

2. A liquid cooled brake system as set forth in claim 1, wherein said valve is responsive to the pressure of liquid in said return line between said brake shoe and valve and is urged toward open position thereby.

3. A liquid cooled brake system as set forth in claim 1, wherein a fluid actuator is connected with said valve and is operative to urge the latter toward closed position, said last named fluid actuator having a connection with said operator controlled means for supplying fluid under pressure to the last named actuator when the operator controlled means is operated to supply fluid under pressure to the first named actuator pressure chamber.

4. A liquid cooled brake system as set forth in claim 1, wherein the valve is responsive to the pressure of liquid in the return line from said brake shoe to the valve and is urged toward open position thereby, and a fluid actuator is connected to said valve and is operative to urge the latter toward closed position, said last named actuator having a connection with said operator controlled means for supplying fluid under pressure to said last named actuator when the operator controlled means is operated to supply fluid under pressure to the first named actuator pressure chamber.

5. A liquid cooled brake system including a brake shoe having a chamber for cooling liquid having inlet and outlet ports, one wall of the chamber having an outer surface adapted for frictional engagement with an adjacent rotatable friction member, operator controlled means having an operative connection with said shoe for applying force to the shoe to move the latter to effect engagement of said outer surface with said member, means for circulating a cooling liquid through said brake shoe chamber including a heat exchanger, a pump having suction and discharge ports, a conduit connecting the heat exchanger with the suction port, a conduit connecting the discharge port with the inlet port of the brake shoe chamber, and a return conduit connecting the brake shoe outlet port with the heat exchanger, and means to oppose distortion of said outer surface during frictional engagement of the latter with said member, comprising means for maintaining the pressure of cooling liquid in said brake shoe chamber substantially porportional to the brake applying force exerted on said shoe by the operation of said operator controlled means including a normally open restricting valve in said return line, said valve being responsive to the pressure in said return line between said valve and brake shoe and urged toward open position thereby, and means connecting the operator controlled means and valve for urging the latter toward closed position when the operator controlled means is operated to effect engagement of said brake shoe with said friction element.

6. A liquid cooled brake system including a movable brake shoe having a chamber for cooling liquid having inlet and outlet ports, one wall of the chamber having an outer friction surface adapted for engagement with a rotatable friction member, a control element having an operative connection with the shoe, said control element having a release position and being operable on movement from release position to effect engagement of the shoe and friction member, means for circulating cooling liquid through said chamber including a heat exchanger, a pump having suction and discharge ports, a conduit connecting the heat exchanger with the suction port, a conduit connecting the discharge port with the inlet port of the brake shoe chamber, and a return conduit connecting the brake shoe chamber outlet port with the heat exchanger, and means to oppose distortion of said outer surface on engagement of the latter with said member, comprising means for controlling the pressure of cooling liquid in said return conduit and brake shoe chamber including valve means associated with said return conduit, said valve means being responsive to the pressure in said return conduit between said valve means and brake shoe chamber and being urged toward open position thereby, and means connecting said valve means and control element, said connecting means being operable on movement of said element from release position to operate said valve means to impose a restriction on the flow of cooling liquid through said return conduit.

7. A liquid cooled brake system including a brake shoe having a chamber for cooling liquid therein, one wall of the chamber having an outer surface adapted for frictional engagement with an adjacent rotatable friction member, a fluid pressure actuator connected to said shoe and operable to effect said frictional engagement, said actuator having a fluid pressure chamber separate from said cooling liquid chamber, operator controlled means for controlling the pressure of fluid in said actuator pressure chamber, means for circulating a cooling liquid through said brake shoe chamber including a pump having inlet and outlet ports connected with the chamber, and means to oppose distortion of said outer surface during engagement of the latter with said member, comprising valve means associated with said circulating means for controlling the pressure of the circulating liquid in said cooling liquid chamber, and means responsive to the pressure of fluid in said actuator pressure chamber for controlling the operation of said valve means, said valve means and said pressure responsive means being so constituted as to maintain the pressure in said cooling liquid chamber proportioned to the pressure in said actuator pressure chamber.

8. A liquid cooled brake system including a brake shoe having a chamber for cooling liquid therein, one wall of the chamber having an outer surface adapted for frictional engagement with an adjacent rotatable friction member, operator controlled means having an operative connection with the shoe for applying force to said shoe to effect said frictional engagement, means for circulating a cooling liquid through said chamber including a pump having inlet and outlet ports connected with the chamber, and means to oppose distortion of said outer surface on engagement of the latter with said member, comprising means associated with said circulating means and controlled by the operation of said operator controlled means for controlling the pressure of the cooling liquid circulated through said chamber by the circulating means in accordance with the degree of force applied to said brake shoe to effect said frictional engagement.

9. A liquid cooled brake system including a brake shoe having a chamber for cooling liquid therein and a thin metallic friction element forming one wall of the chamber, a portion of the outer surface of the element being adapted for frictional engagement with an adjacent rotatable friction member and a corresponding portion of the inner surface of the element being exposed in said chamber for direct contact with cooling liquid in said chamber, operator controlled means for actuating said shoe to effect said frictional engagement, means independent of the operator controlled means for circulating a cooling liquid through said chamber in direct contact with said exposed inner surface portion of said metel element, and means operable during frictional engagement of said member and element to pressurize the liquid in said chamber sufficiently to oppose distortion of said element inwardly of the chamber due to said engagement, said means including pressure control means associated with said liquid circulating means for controlling the pressure of the circulating liquid in said chamber, and means controlled by the operator controlled means to operate said pressure control means for establishing and maintaining a pressure in said chamber proportional to the engaging force applied to said shoe by the operation of said operator controlled means.

10. A liquid cooled disc brake system including a stationary annular cylinder, a piston slidably mounted in the cylinder and forming in connection therewith a pressure chamber, an open ended annular channel for cooling liquid formed in the outer end of the piston, a thin annular metal friction element on the end of the piston forming an end wall for said channel, spaced inlet and outlet ports in said channel, said channel and element forming a cooling liquid chamber separate from said pressure chamber, means for circulating cooling liquid through said channel including a reservoir, a circulating pump having a suction port connected to said reservoir, and a discharge port connected to the inlet port of piston channel, and a return connection from said piston channel outlet port to said reservoir, an operator controlled source of fluid pressure connected to said pressure chamber in the cylinder, an annular friction ring mounted for rotation adjacent said metal friction element concentric with the cylinder axis and engageable by the outer surface of said element on movement of the piston outward in said cylinder in response to an increased fluid pressure in said pressure chamber, and means for controlling the pressure in the channel for supporting the portion of said element exposed in said piston channel against inward displacement during engagement of the element with said friction ring, said means including a restricting valve associated with said return connection and biased toward open position by the pressure of liquid in said return connection between said valve and piston channel outlet port, a fluid pressure actuator connected to the valve for moving it toward closed position, and a connection between said fluid pressure actuator and said operator controlled source of fluid pressure, said valve serving to control the flow of cooling liquid through said piston channel and to change the pressure of liquid therein in accordance with changes in the pressure of fluid in said pressure chamber.

11. A liquid cooled power operated brake system including a brake shoe having a chamber for cooling liquid having inlet and outlet ports, one wall of the chamber having an outer surface adapted for frictional engagement with an adjacent rotatable friction member, a fluid actuator connected with the brake shoe for moving the latter to effect said frictional engagement, means for circulating a cooling liquid through said brake shoe chamber comprising a liquid circuit including a liquid pump having suction and discharge ports, a conduit connecting the discharge port of the pump with the inlet port of the chamber, and a return connection between the outlet port of the chamber and the suction port of the pump, a master cylinder connected with said fluid actuator having an operating rod, a brake pedal lever having a pivotal connection intermediate its ends with the rod and having an operator's pedal at one end thereof, a second fluid actuator having a pressure responsive member pivotally connected to the pedal lever intermediate the first named pivotal connection and the other end of said lever, said second actuator being connected to said liquid circuit, a stop adjacent said other end of the lever for limiting the rotation thereof about said first named pivotal connection, a normally open restricting valve associated with said return connection for controlling the flow of cooling liquid therethrough, and a connection between said valve and lever for moving said valve, said connection to the lever being spaced therealong from the first named pivotal connection.

12. A liquid cooled and power operated brake system as set forth in claim 11, wherein the valve is responsive to the pressure in said return connection between said valve and brake shoe chamber and is urged toward open position thereby.

13. Power operated brake mechanism including a brake shoe, a brake pedal lever, an operative connection between the shoe and lever pivotally connected to the latter intermediate the ends thereof, an operator's pedal having a connection with one end of the lever, a fluid motor connected to the lever intermediate said pivotal connection and the other end thereof, a fluid circuit comprising a pump having suction and discharge ports and conduit means connecting the ports, a normally open restricting valve associated with said conduit means operable on closing movement of the valve to impose a restriction on the flow of fluid through said conduit means and to increase the pressure in the portion thereof between the valve and pump discharge port, a connection between the fluid motor and the portion of said conduit means between said valve and said pump discharge port, and a connection between the valve and lever spaced therealong from said pivotal connection with the brake pedal lever, rotation of the lever about said pivotal connection to close said valve being opposed by said fluid motor.

14. Liquid cooled and fluid pressure operated frictional mechanism including an annular cylinder member, an annular piston member slidably mounted in the cylinder member and forming a pressure chamber therebetween, an annular channel for cooling liquid in said piston member, the wall of said channel at the outer end of the piston member having a friction surface and the opposite wall of the channel forming a wall of said pressure chamber, means for supplying fluid under pressure to the pressure chamber to move the piston, means separate from and independent of said fluid supplying means for supplying circulating cooling liquid to said channel and for discharging cooling liquid therefrom including an inlet conduit on one of the members extending through said pressure chamber and into an inlet bore in the other of the members, and an outlet conduit on one of the members extending through said pressure chamber and into an outlet bore in the other of the members, the inlet and outlet conduits and the corresponding bores respectively forming inlet and outlet connections to said cooling liquid channel, and sealing means associated with said conduits and bores for preventing the flow of fluid and coolant between said channel and pressure chamber in either direction.

15. Liquid cooled and fluid pressure operated frictional mechanism as set forth in claim 14, wherein said conduits are in sliding engagement with the walls of the corresponding bores and serve to prevent rotation of said piston member in said cylinder member.

16. Liquid cooled brake mechanism including a rotatable brake member, a brake shoe having a chamber for cooling liquid therein, said brake shoe chamber having an outer surface engageable with said member, a fluid actuator operatively associated with the brake shoe and having a pressure chamber separate from the cooling liquid chamber, means for supplying fluid under pressure to said pressure chamber to move said brake shoe, inlet and outlet ports in said cooling liquid chamber, cooling liquid circulating means including liquid connections with said inlet and outlet ports for circulating cooling liquid through said cooling liquid chamber, and means for opposing distortion of said outer surface during engagement of the latter with said member, comprising a pressure control valve associated with said cooling liquid circulating means for controlling the pressure of cooling liquid in said cooling liquid chamber, and means responsive to the pressure of fluid supplied to said pressure chamber for controlling the operation of said valve, said pressure control valve and said pressure responsive means being so constituted as to maintain the pressure in said cooling liquid chamber porportioned to the pressure in said actuator pressure chamber.

References Cited in the file of this patent

UNITED STATES PATENTS

| 2,051,286 | Boykin | Aug. 18, 1936 |
| 2,226,457 | Whittingham | Dec. 24, 1940 |
| 2,378,100 | Pogue | June 12, 1945 |
| 2,406,304 | Levy | Aug. 20, 1946 |
| 2,414,753 | Majneri | Jan. 21, 1947 |
| 2,471,858 | Bloomfield | May 31, 1949 |
| 2,664,176 | Whalen | Dec. 29, 1953 |
| 2,747,702 | Van Zelm | May 29, 1956 |
| 2,821,273 | Sanford et al. | Jan. 28, 1958 |

FOREIGN PATENTS

| 701,725 | Great Britain | Dec. 20, 1953 |
| 739,244 | Great Britain | Oct. 26, 1955 |